United States Patent Office 3,532,656
Patented Oct. 6, 1970

3,532,656
AMMONIUM HYDROXIDE POLYMER SOLUTIONS FOR FLOOR POLISH COMPOSITIONS
Donald L. Burdick, Overland Park, Kans., and William J. Heilman, Allison Park, and Gerald J. Mantell, Allentown, Pa., assignors to Gulf Research & Development Company, Pittsburgh, Pa., a corporation of Delaware
No Drawing. Original application Jan. 19, 1967, Ser. No. 610,253, now Patent No. 3,488,311. Divided and this application Mar. 19, 1969, Ser. No. 816,479
Int. Cl. C08f 45/52
U.S. Cl. 260—28.5        1 Claim

ABSTRACT OF THE DISCLOSURE

Aqueous dispersion floor polishes containing partially esterified copolymers of maleic anhydride and an olefin selected from the group consisting of 1-hexene, 1-butene dimers, 1-octene, and 1-decene are disclosed.

---

This case is a divisional application of Ser. No. 610,253 filed Jan. 19, 1967 now Pat. No. 3,488,311.

In the manufacture of floor polish of the aqueous dispersion type, it is now common practice to include in polish formulations an aqueous solution of an ammonium salt of a carboxy-substituted polymeric product derived from a copolymer of styrene and maleic anhydride. Soluble resins of this type are often referred to as leveling resins. The polishes made with the use of polymer solutions of this type show improved heelmark-resistance, lighter color and better thermal stability than the prior art polish formulations. However, they are somewhat deficient in many formulations, particularly with respect to recoatability and waterspot resistance. These defects appear to be associated with poor compatibility with some of the other ingredients in polish formulations.

A class of soluble resins has now been discovered which are more compatible with the ingredients of polish formulations and confer on these aqueous dispersion polishes better coatability, recoatability, gloss, jetness, transparency, leveling and resistance to waterspotting, while maintaining the good heelmark-resistance, light color and thermal stability of the modified styrene-maleic anhydride copolymers.

Briefly, the new ammonium hydroxide soluble resins are partially esterified copolymers of maleic anhydride with an olefin selected from the group consisting of 1-hexene, 1-butene dimers, 1-octene and 1-decene in olefin/maleic anhydride molar ratios of from about 1 to 1.5, which have acid numbers of at least 150, are substantially free from anhydride structures and adjacent free carboxy groups, at least half of the carbonyl groups being present in the form of esters of primary alcohols having from one to four carbon atoms, the inherent viscosity of the copolymers measured at 77° F. (25° C.) in acetone being within the range of about 0.04 to 1.1 deciliters per gram (at 5 g./dl. conc.). An especially preferred resin is the partially esterified approximately equimolar copolymer of 1-hexene with maleic anhydride in which about half of the available carboxy groups are present in the form of the methyl ester. This resin, in addition to other advantages over the styrene-maleic acid copolymers, can be dissolved in aqueous ammonium hydroxide at room temperature, without heating, to yield solutions of relatively high solids content at low viscosity.

The improved floor polish compositions which employ the new resins comprise an aqueous solution of the ammonium salt of a partially esterfied copolymer of maleic anhydride with an olefin selected from the group consisting of 1-hexene, 1-butene dimers, 1-octene and 1-decene having an olefin/maleic anhydride molar ratio from about 1 to 1.5, which have acid numbers of at least 150, are substantially free from anhydride structures and adjacent free carboxy groups, about half of the carbonyl groups being present in the form of esters of primary alcohols having from one to four carbon atoms, the inherent viscosity of the copolymer being within the range of about 0.04 to 1.1 dl./g., at least one other resin or a wax in aqueous dispersion, and at least one organic solvent.

Suitable resins for manufacture of the improved polish compositions may be made as described below.

Maleic anhydride will copolymerize readily with 1-olefins, including 1-hexene, 1-olefins made by dimerization of 1-butene and various 8 to 10-carbon 1-olefins. The process generally consists of polymerization in solution in a convenient solvent such as benzene at a temperature between about 60° and 100° C., initiated with a free radical initiator as, for example, about 2 to 3 weight percent of benzoyl peroxide based on maleic anhydride. An excess of 1-olefin, preferably in a molar ratio of about 2:1 is customarily employed in order to increase the conversion of maleic anhydride to copolymer. The molecular weight may be reduced as desired by use of chlorinated hydrocarbon chain-transfer agents such as carbon tetrachloride. The following procedure is given for illustrative purposes.

1-hexene and maleic anhydride are conveniently copolymerized in solution in propylene dichloride. The polymer is formed either in solution or in a second liquid phase, depending upon the amount of solvent and monomer present. 1-hexene acts as a non-solvent for the polymer, and as the ratio of hexene to propyplene chloride is increased, the polymer forms in a separate liquid phase, as indicated in the table below. In a typical polymerization the volume of propylene dichloride may be kept at twice the volume of hexene and the reaction system will remain a single liquid phase. The polymer is then conveniently recovered by precipitation upon the addition of an aliphatic hydrocarbon such as heptane. When about two volumes of heptane per volume of propylene dichloride are mixed with the product solution at room temperature, a fine, easily filterable polymer powder is precipitated in suspended form. Unreacted maleic anhydride can be removed by leaching with boiling heptane or octane. If the reaction is carried out at about 80 C. for 12 to 14 hours with at least .01 mole of benzoyl peroxide per mole of maleic anhydride, essentially all of the maleic anhydride is reacted, so that leaching of unreacted maleic anhydride from the product is unnecessary. The polymer, after filtering, may be dried under vacuum to remove residual hydrocarbons. The solvents employed and the unreacted 1-hexene are normally separated by distillation and recycled to the process.

TABLE I.—COPOLYMERIZATION OF 1-HEXENE WITH MALEIC ANHYDRIDE

Charge:
  1,000 cc.—propylene dichloride
  196 g. to 784 g.—maleic anhydride (2–8 moles)
  4.84 g.—benzoyl peroxide (0.02 moles)

| Maleic anhydride, moles | Hexene, cc. | Temp., ° C. | Appearance |
|---|---|---|---|
| 2 | 250 | 80 | Solution. |
| 3 | 375 | 80 | Do. |
| 4 | 500 | 80 | Clear solution. |
| 6 | 750 | 77 | Viscous polymer phase—could be stirred. |
| 8 | 1,000 | 75 | Do. |

Following the procedure outlined above employing a mole ratio of reagents of about 4 moles of hexene to 2 moles of maleic anhydride with .02 moles of benzoyl peroxide, essentially complete conversion of maleic anhydride to a copolymer containing approximately equimolar proportions of olefin and maleic anhydride is obtained at about 80° C. within ten to twelve hours. The polymer product recovered by filtration is then esterified by reacting with alcohols such as methanol, ethanol, propanol or butanol.

The catalyst for this reaction can be any material having an ionization constant at 25° C. of at least about $1 \times 10^{-3}$. Suitable catalysts include liquid mineral acids having the required ionization constants, for example, sulfuric, hydrochloric, nitric and phosphoric acids; organic acids, such as benzene sulfonic and p-toluene sulfonic acids which are readily soluble in the reaction medium; and solid acidic materials including, but not limited to ion exchange resins. The mineral acids normally come in aqueous solution and concentrations in aqueous solution between 25 percent and 100 percent are suitable. Concentrations of acid below about 25 percent are especially unsuitable when the higher carbon number (above 4) alcohols are employed since the more dilute acid will cause formation of a separate aqueous phase in the reactor.

The amount of liquid acid catalyst employed can vary over a wide range. Usually the weight percent of anhydrous acid based on the weight of copolymer is between 0.05 and 5, preferably between 0.1 and 1 weight percent.

The esterification reaction occurs by contacting the anhydride and alcohol charge stocks at a temperature and for a time sufficient to result in the formation of the half-ester. The reaction temperature is suitably between 40° and 180° C. The initial reaction temperature can be an elevated temperature of between, for example, 100° to 120° C., but at least the final portion of the reaction must be run at a temperature below about 80° C. for a time sufficient to convert substantially all of the anhydride groups to half-ester groups. It has been discovered that, in order to obtain a substantially pure half-ester compound, i.e., free of cyclic anhydride groups, from the reaction of the copolymer anhydride with an alcohol, the reaction temperature during at least the final portion of the esterification reaction, and the temperature during the recovery of the half-ester must be maintained below about 80° C. At temperatures above about 80° C., the half-ester compounds formed in accordance with this invention tend to decompose, yielding cyclic anhydride structures and alcohol, especially under conditions such as may exist in a drying oven, where the alcohol is removed as it is formed. In order to obtain a faster rate of reaction initially, it is feasible to employ a reaction temperature between 80° C. and 180° C., usually between 100° C. and 120° C., so long as the final portion of the esterification reaction is run at a temperature less than about 80° C., and sufficient alcohol is maintained in contact with the anhydride compound to assure formation of the half-ester. The half-ester is the exclusive initial reaction product and no diester forms unless and until water is removed from the reaction zone, even in the presence of an excess of a water soluble alcohol, such as methanol.

The reaction pressure is not critical, but should be such that the reactants and products are maintained in the liquid phase. Suitable reaction pressures include atmospheric to 100 p.s.i.g. or higher.

The preferred alpha olefin-maleic anhydride copolymers are initially insoluble in the alcohol and gradually dissolve in the alcohol as the half-ester is produced. Sufficient alcohol is normally employed to not only serve as a reactant, but to serve as a solvent for the system. As a practical matter, the volume ratio of alcohol to the anhydride form of the copolymer is usually between 20:1 and 100:1, which assures formation of a product solution with a viscosity low enough to make the solution easy to handle, i.e. to pump or stir.

If desired, stoichiometric amounts of alcohol can be employed together with a mutual solvent for the reactants. Suitable mutual solvents include benzene, acetone, 2-butanone, propylene chloride, and iso-octane. However, the use of a mutual solvent involves added expense and difficulties in the separation of products.

The reaction time should be sufficient to result in the formation of the desired half-ester. The usual reaction time is between 0.5 and 24 hours. The exact reaction time can be determined by following the reaction with suitable means, such as with infrared analysis until the anhydride carbonyl absorption peak disappears, that is, by periodically removing samples and subjecting them to analysis, such as infrared, to determine if any carbonyl groups are present as anhydride groups. This time can be shortened by the initial use of high temperatures, but the completion of the reaction, usually the last 20 to 60 minutes, must be at a temperature below 80° C., usually between 40° and 60° C.

The reaction can be run in a batch or continuous manner or through a coil type reactor.

The reaction products are recovered by any suitable procedure. If it is desirable to recover the half-ester substantially free of anhydride, the temperature during the recovery procedure must at all times be maintained below about 80° C., preferably between 0° C. and 60° C. Half-esters prepared by using alcohols having between 1 and 4 carbon atoms can be recovered in a solid particulate form by precipitating the half-ester from reaction solution by contact with an excess of water at a temperature below 80° C., preferably room temperature. The half-esters are recovered by filtration, are washed with water to remove any traces of alcohol and acid catalyst and are then dried under a vacuum (preferably a pressure of between 1 and 50 mm. of Hg) at a temperature suitable to obtain the product desired. To obtain a product substantially anhydride free, temperatures less than 80° C., preferably between 0° and 60° C. should be employed. An inert dry gas, such as nitrogen, can be passed over the solid half-ester to aid in the drying process. By drying is meant substantially free, i.e., less than 2 weight percent, of physically bound alcohol. The particulate solid half-ester obtained by this procedure is pure white in color. A typical half-ester preparation is specifically exemplified below.

In this example, 237.4 grams of equimolar 1-hexane-maleic anhydride copolymer and 662.4 milliliters of methanol were employed along with 2.37 grams of 85 percent phosphoric acid. The weight percent of anhydrous acid based on the copolymer was 0.85. The reaction was run for 10.5 hours at 64° C. Nine samples were taken over the course of the reaction and subjected to infrared analysis to determine the anhydride carbonyl content of the reaction mixture. The reaction was terminated when the ninth sample indicated the absence of anhydride carbonyl absorption peaks. A yield of 262.1 grams of dried polymer was obtained. The polymer had a dilute solution viscosity in acetone of 0.078 deciliter per gram, and an acid number of 256. The theoretical acid number for the pure half-ester was 262. The sample was subjected to nuclear magnetic resonance to determine the carbonyl content of the sample present as acid, anhydride and ester. The data from the these analyses indicated the absence of anhydride structures and the presence of 59.2 mole percent of the carbonyl groups as free acid, the balance being present in the ester groups.

Below are tabulated the properties of several other copolymers of maleic anhydride with various olefins and esters thereof, made according to the procedures outlined and exemplified above:

| Comonomer | Copolymer properties $\eta$ (inh.), dl./g. | Ester properties Alcohol | Acid No. |
|---|---|---|---|
| 1-hexene | 0.80 | n-Butyl | 196 |
| Do | 0.80 | Isobutyl | 187 |
| 1-decene | 0.68 | Propyl | 169 |
| 1-hexene | 0.06–0.07 | Methyl | 236–254 |
| Do | 0.07 | Propyl | 212 |
| Do | 0.06 | do | 225 |
| 1-octene | 0.07 | Methyl | 204 |
| 1-hexene | 0.10 | n-Butyl | 186 |

NOTE.—Inherent viscosities measured in acetone at 77° F. and a concentration of 5 g. per deciliter.

Several characteristics of the esterified polymers can be controlled so as to render them soluble in aqueous basic media and suitable for use in polish formulations. These are discussed individually below.

INFLUENCE OF ALCOHOL CHAIN LENGTH

With increasing length of the alcohol carbon chain there is decreasing solubility in aqueous ammonia, increasing viscosity in solution, slight decrease in compatibility with other polish ingredients and some decrease in performance evaluation of polishes. Primary alcohols of one to four carbon atoms are found to give the best performance in polish formulations.

INFLUENCE OF ACID NUMBER

With increasing acid number the solubility in aqueous ammonia increases and there is an increasing tendency of polish films to be water-sensitive. Acid numbers should be sufficiently high to assure solubility (about 150) but no higher than the theoretical value for 50 percent ester for consistently good performance. In products which have been esterified beyond the 50 percent level, there are present some adjacent carbalkoxy structures. These have a tendency to reduce solubility, particularly in higher molecular weight copolymers and when the esters are propyl or butyl. If consistently good solubility in aqueous ammonia is desired, it is best to terminate esterification when the acid number of the product is approaching the theoretical value for the half ester. In the preferred products the distribution of carboxy and carbalkoxy groups in the copolymer molecules appears to be random, as indicated by conventional chemical and physical tests.

INFLUENCE OF MOLECULAR WEIGHT

With increasing molecular weight of the esterified copolymers, polish performance is better with respect to durability and other properties. For satisfactory performance, the molecular weight should be sufficiently low to assure solubility and a solution viscosity which is low enough for convenient use in formulating polishes. The inherent viscosity of the copolymer should be from about 0.04 to 1.1, preferably from 0.05 to 0.5, with an acid number approaching the theoretical value of the half-ester, preferably about 185 to 250 for best all-around performance in a variety of polish formulations. For outstanding ease of formulation, the products of lower inherent viscosity and higher acid number are more desirable. Such products dissolve more readily, form less viscous solutions, are very compatible with other polish ingredients and are very consistent in giving good performance. The use of a versatile product of the latter type is specifically exemplified below.

There was dissolved in aqueous ammonium hydroxide a methyl ester of a copolymer of hexene and maleic anhydride prepared according to the procedure described above, yielding a solution of workable viscosity at 20 percent solids content. The methyl ester copolymer had a softening point of approximately 131° C., an acid number of 250, an inherent viscosity of 0.06 and was obtained by esterification of an approximately equimolar copolymer of 1-hexene with maleic anhydride. Three polish formulations were prepared having a 15 percent solids content and employing the copolymer ester solution. The compositions of the three formulations are indicated in the following table:

TABLE II.—15 PERCENT SOLIDS POLISH DISPERSIONS

| | Formula | | |
|---|---|---|---|
| | I | II | III |
| | Parts | Parts | Parts |
| Aqueous resin dispersions: | | | |
| Modified polystyrene latex (Ubatol UL-2001) at 15% | 60.0 | | |
| Modified styrene-acrylic latex (Neocryl A-247) at 15% | | 70.0 | |
| Modified acrylic latex (Rhoplex B-231) at 15% | | | 72.5 |
| Aqueous polyethylene dispersion (Poly-Em) at 15% | 20.0 | 15.0 | 11.0 |
| Hexene-maleic copolymer methyl ester solution at 15% | 20.0 | 15.0 | 16.0 |
| Organic solvents: | | | |
| Tributoxy ethyl phosphate | 0.8 | 0.5 | 0.4 |
| Carbitol | 0.1 | 2.0 | 1.25 |
| Ethylene glycol | | | 1.25 |
| Dibutyl phthalate | 0.2 | | |
| Butyl benzyl phthalate | 0.4 | | |
| Oleic acid | 0.3 | | |
| Surface active leveling agent: Fluorinated anionic surfactant (FC-128) at 1% | | 1.0 | 1.0 |

The polish formulations were evaluated on vinyl asbestos floor tiles by A.S.T.M. procedures or modifications thereof recommended by the Chemical Specialties Manufacturer's Association. The results appear in the table below.

TABLE III.—EVALUATION OF POLISH FORMULAS OF TABLE II

| Polish formulation | I | II | III |
|---|---|---|---|
| Gloss: | | | |
| Single coat | Very good | Good | Good. |
| Double coat | Excellent | Excellent | Excellent. |
| Recoatability (1 hr.) | Very good | do | Do. |
| Waterspotting: | | | |
| 2 hr | Moderate | Slight | Moderate. |
| 24 hr | Slight to very slight | do | Moderate to slight. |
| Leveling | Good | Good | Good. |
| Removability | Excellent | Excellent | Excellent. |
| Haze | No | No | No. |
| Heelmark resistance | Good | Very good [a] | Excellent.[a] |
| Static coefficient of friction [b] | 0.44 | 0.35 | 0.51. |
| Freeze-thaw stability: | | | |
| Number of cycles | 3 | 3 | 3. |
| Initial pH | 9.3 | 9.3 | 7.8. |
| Final pH | 9.3 | 9.3 | 7.8. |
| Haze | No | Moderate to slight | No. |
| Oven stability (30 days): | | | |
| Initial pH | 9.3 | 9.3 | 7.8. |
| Final pH | 9.3 | 9.3 | 7.8. |
| Haze | Very slight | Slight | No. |
| Environmental conditions | Temperature, 72° F., relative humidity, 47% | | |

[a] Very good gloss and jetness.
[b] GSA No. 1 Control −0.36.

A corresponding propyl ester was made by esterification of the copolymer of 1-hexene and maleic anhydride. The propyl ester had a softening point of 106° C., an acid number of 212 and dissolved readily in aqueous ammonium hydroxide. The solution of the propyl ester in ammonium hydroxide was employed in three polish formulations corresponding to Formulas I, II and III above which were tested on vinyl asbestos floor tiles. The results obtained were substantially equivalent to those which appear in Table III. The only significant difference which appeared in the results was in heelmark resistance, which only rated "good." This difference in behavior is probably attributable to the lower softening point of the propyl ester. The gloss, leveling, recoatability and water spotting resistance in all instances were consistently better when compared with the performance of a corresponding commercial ammonium hydroxide-soluble styrene-maleic acid resin.

In addition to the ammonium salts, the half-ester copolymers of the present invention also form water-soluble salts with various water-soluble amines such as morpholine or the ethanolamines. The aqueous solutions of amine salts are equally useful in formation of improved floor polishes. However the ammonium salts are preferred because they are cheap and quickly yield good polish coatings which are odorless, colorless, durable, and yet are easily removed prior to recoating.

The half-ester copolymers of the present invention are suitable for use in heavy duty buffable polishes and in dry-bright polish formulations of the type which yield finishes which are resistant to detergents and are therefore washable, but which are readily removable with aqueous ammonia. The compositions of typical formulations are tabulated below, along with formulations employing a modified styrene-maleic anhydride copolymer, for purposes of comparison.

TABLE IV.—DETERGENT-RESISTANT POLISH FORMULATIONS

| Formula | Parts | | | | |
|---|---|---|---|---|---|
| | 1 | 2 | 3 | 4 | 5 |
| Modified polystyrene latex (Ubatol U-3101) at 15% | 65 | 65 | 65 | 65 | |
| Hard wax emulsion (Oxidized microcrystalline-Montan blend) at 15% | | | | | 80 |
| Hexene-maleic copolymer methyl ester solution at 15% | 20 | 20 | | | 20 |
| Modified styrene-maleic anhydride copolymer at 15% | | | 20 | 20 | |
| Disodium zinc ethylenediiminotetraacetate at 7.5% | 2.0 | | 2.0 | | |
| Aqueous polyethylene dispersion (Poly-Em) at 15% | 15 | 15 | 15 | 15 | |
| Ammonium zirconyl carbonate at 20% | | 1.4 | | 1.4 | |
| Tributoxy ethyl phosphate | | 0.9 | | 0.9 | 1.5 |
| Methyl carbitol | 1.8 | 2.0 | 1.8 | 2.0 | |
| 2-pyrrolidone | 0.5 | | 0.5 | | |
| Fluorinated anionic surfactant (FC-128) at 1% | 1.0 | 1.0 | 1.0 | 1.0 | 1.0 |

Formulations 1–4 are detergent resistant polishes. These were tested for ability of the polish coating to resist three cleaning compositions. Results were as follows:

TABLE V.—NUMBER OF STROKES TO REMOVE FINISH

| Cleaning Composition | Formulation | | | |
|---|---|---|---|---|
| | 1 | 2 | 3 | 4 |
| (1) 1.5% solution of laundry detergent (Tide) | >200 (10%) | >200 (40%) | >200 (75%) | 131 |
| (2) Industrial soap solution with 0.5% NH₄OH | 90 | 86 | 44 | 88 |
| (3) 1.5% solution of laundry detergent plus 2.8% NH₄OH | 40 | 48 | 26 | 19 |

Formulation 1 showed the best resistance to detergents, while being readily removable with detergents containing ammonia.

Formulation 5 was applied to vinyl asbestos tile and evaluated according to bench test procedures, as in Table III. Results are tabulated below.

TABLE VI

Evaluation of formulation No. 5

Gloss:
  1 coat _____ F–G
  Buffed _____ +(V.G.)
  2 coats _____ F–G
  Buffed _____ +(V.G.)
Recoat _____ V.G.
Drag _____ None.
Waterspotting:
  2 hr. _____ Sl.
  24 hr. _____ V. Sl.
Leveling _____ G.
Removability _____ 40 strokes
Haze _____ Sl.–V. Sl.

The performance of the novel copolymer half-esters was clearly satisfactory in this heavy buffable industrial-type polish formulation.

What is claimed is:

1. The floor polish composition comprising a minor proportion of an aqueous solution of the ammonium salt of a partially esterified copolymer of maleic anhydride with an olefin selected from the group consisting of 1-hexene, 1-butene dimers, 1-octene and 1-decene in a molar ratio of olefin to maleic anhydride of from about 1 to 1.5, which has an acid number of at least 150, is substantially free from anhydride structures and adjacent free carboxy groups, at least half of the carbonyl groups in said copolymer being present in the form of esters of primary alcohols having from one to four carbon atoms, said copolymer having an inherent viscosity in the range of about 0.04 to 1.1 deciliters per gram measured at a concentration of 5 g. per deciliter in acetone at 25° C., in combination with a major proportion of an aqueous dispersion of a hard wax and a small amount of tributoxyethyl phosphate, less than the amount of copolymer present in the composition.

References Cited

UNITED STATES PATENTS 3,236,797 2/1966 Williams _____ 106—262
3,247,141 4/1966 Stryker.
3,328,325 6/1967 Zdanowski.

FOREIGN PATENTS 201,429 2/1955 Australia.

MORRIS LIEBMAN, Primary Examiner

P. R. MICHL, Assistant Examiner

U.S. Cl. X.R.

260—78.5